United States Patent [19]

Ten Eyck et al.

[11] Patent Number: 5,536,296
[45] Date of Patent: Jul. 16, 1996

[54] PROCESS FOR TREATING MOLTEN ALUMINUM WITH CHLORINE GAS AND SULFUR HEXAFLUORIDE TO REMOVE IMPURITIES

[75] Inventors: Nancy J. Ten Eyck; Michael C. Lukens, both of Texarkana, Tex.

[73] Assignee: Alumax Inc., Norcross, Ga.

[21] Appl. No.: 433,091

[22] Filed: May 3, 1995

[51] Int. Cl.$^6$ .................................................. C22B 21/06
[52] U.S. Cl. .......................................... 75/681; 420/542
[58] Field of Search ............................ 75/681; 420/542, 420/528

[56] References Cited

U.S. PATENT DOCUMENTS

| | | |
|---|---|---|
| 4,138,245 | 2/1979 | Stary . |
| 4,668,351 | 5/1987 | Dewing et al. . |
| 4,959,101 | 9/1990 | MacNeal et al. . |
| 4,992,241 | 2/1991 | Provencher et al. . |
| 5,145,514 | 9/1992 | Gariepy et al. ........................... 75/681 |

*Primary Examiner*—Melvyn Andrews
*Attorney, Agent, or Firm*—Jones & Askew

[57] ABSTRACT

There is disclosed an improved process for treating molten aluminum or aluminum alloys containing impurities, such as alkali metals, alkaline earth metals and hydrogen, to reduce the amount of impurities contained therein by in-line rotor degassing. The process comprising the sequential steps of: (a) contacting said molten aluminum or aluminum alloy with chlorine gas by rotor injection; and (b) contacting the molten aluminum or aluminum alloy with a mixture of chlorine gas and sulfur hexafluoride gas by rotor injection, wherein the chlorine gas flow rate in step (a) is between approximately 0.005 to 0.025 scfm and the gas flow rate in step (b) is a combination of a sulfur hexafluoride gas flow rate of between approximately 0.012 and 0.032 scfm and a chlorine gas flow rate of between approximately 0.005 to 0.025 scfm and wherein the ratio of sulfur hexafluoride flow to chlorine gas flow in step (b) is between approximately 1.25 and 2.5 by volume for a molten aluminum or aluminum alloy flow rate of between approximately 620 and 810 lbs/min.

14 Claims, 1 Drawing Sheet

PROCESS FOR TREATING MOLTEN ALUMINUM WITH CHLORINE GAS AND SULFUR HEXAFLUORIDE TO REMOVE IMPURITIES

FIELD OF INVENTION

The present invention relates generally to methods for treating molten aluminum or aluminum alloys in order to remove impurities therefrom, and, more specifically, to a method of treating molten aluminum or aluminum alloys with chlorine gas and sulfur hexafluoride by in-line rotor degassing.

BACKGROUND OF THE INVENTION

The presence of alkali metals in aluminum alloys, especially Al-Mg alloys, is known to cause cracking during sheet ingot rolling. This is particularly true of sodium for which concentrations as low as a few ppm can reduce formability under heated conditions (plasticity) and cause edge cracking during rolling operations. Hydrogen dissolved in molten aluminum can also cause problems during rolling as well as defects in the finished products.

It is known in the art to treat molten aluminum with chlorine gas and gaseous fluorine compounds. The chlorine gas is added to remove alkali and alkaline earth metals and hydrogen from the molten aluminum. The addition of the chlorine gas causes a brittle oxide crest to form on the metal. The fluorine gas, such as $SF_6$, is added to prevent this oxide crust from forming. U.S. Pat. No. 5,145,514 (the disclosure of which is incorporated herein by reference) discloses that the fluorine and chlorine gases are introduced in a ratio of the fluorine gas to the chlorine gas of from 0.01 to 1.0. In addition, that patent discloses that the volume of the fluorine gas is between 2.12 and 10.75 NL/min. and the chlorine gas is between 0.24 and 4.45 NL/min.

U.S. Pat. No. 4,992,241 relates to a process for processing aluminum. The process includes treating molten aluminum with a combination of a nonreactive gas and a reactive gas. The reactive gas can be chlorine, $SF_6$ or a mixture thereof. The reactive gas comprises between 2% and 20% by volume of the treatment gas. The patent discloses treatment gas flow rates in the range of 2–6 l/min. for a 300 kg melt.

U.S. Pat. No. 4,959,101 discloses a process for degassing aluminum melts without substantially altering the magnesium content of the melt. The process comprises contacting the melt with a mixture of an inert gas and a halogenated sulfur compound, such as sulfur hexafluoride. The sulfur compound is present in the inert gas in an amount between 2% and 20%. The amount of the treatment gas used is disclosed to be about 35 cubic feet per ton of aluminum at a pressure of about 30–45 psig.

U.S. Pat. No. 4,668,351 relates to a method of purifying aluminum contaminated with cerium or other rare earth metals. The method comprises contacting the molten aluminum with a halogenating agent, such as chlorine gas or aluminum fluoride. The amount of the halogenating agent is disclosed as being at least stoichiometric with respect to the cerium.

U.S. Pat. No. 4,138,245 relates to a process for removing sodium from an aluminum melt. The process comprises fluxing the molten aluminum with chlorine gas. The patent discloses a treatment rate of 1 liter per minute of chlorine gas for a 250 kg charge of aluminum.

It is believed that prior art utilizes relatively large chlorine flow rates, and, consequently, produces relatively high emissions and environmental pollution problems. Therefore, a need exists for an improved process for treating molten aluminum and aluminum alloys which utilizes lower amounts of chlorine and produces lower amounts of emissions without adversely affecting the cleanliness and quality of the treated metal.

SUMMARY OF THE INVENTION

The present invention satisfies the above-described needs by providing an improved process for treating molten aluminum or aluminum alloys containing impurities, such as alkali metals, alkaline earth metals and hydrogen, to reduce the amount of impurities contained therein by in-line rotor degassing. The process comprising the sequential steps of: (a) contacting said molten aluminum or aluminum alloy with chlorine gas; and (b) contacting the molten aluminum or aluminum alloy with a mixture of chlorine gas and sulfur hexafluoride gas, wherein the chlorine gas flow rate in step (a) is between approximately 0.005 to 0.025 scfm and the gas flow rate in step (b) is a combination of a sulfur hexafluoride gas flow rate of between approximately 0.012 and 0.032 scfm and a chlorine gas flow rate of between approximately 0.005 to 0.025 scfm and wherein the ratio of sulfur hexafluoride flow to chlorine gas flow in step (b) is between approximately 1.25 and 2.5 by volume for a molten aluminum or aluminum alloy flow rate of between approximately 620 and 810 lbs/min.

Accordingly, it is an object of the present invention to provide an improved process for removing impurities from molten aluminum or aluminum alloys.

Another object of the present invention is to produce aluminum or aluminum alloys with reduced edge cracking and improved plasticity.

A further object of the present invention is to provide a process for treating molten aluminum or aluminum alloys having lower levels of alkali and alkaline earth metals.

Yet another object of the present invention is to provide an improved process for producing aluminum or aluminum alloys having lower levels of sodium and calcium.

Still another object of the present invention is to provide an improved process for producing aluminum or aluminum alloys having lower levels of magnesium chloride.

Another object of the present invention is to provide an improved process for treating molten aluminum or aluminum alloys to produce lower levels of molten chloride salts.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Figure 1:
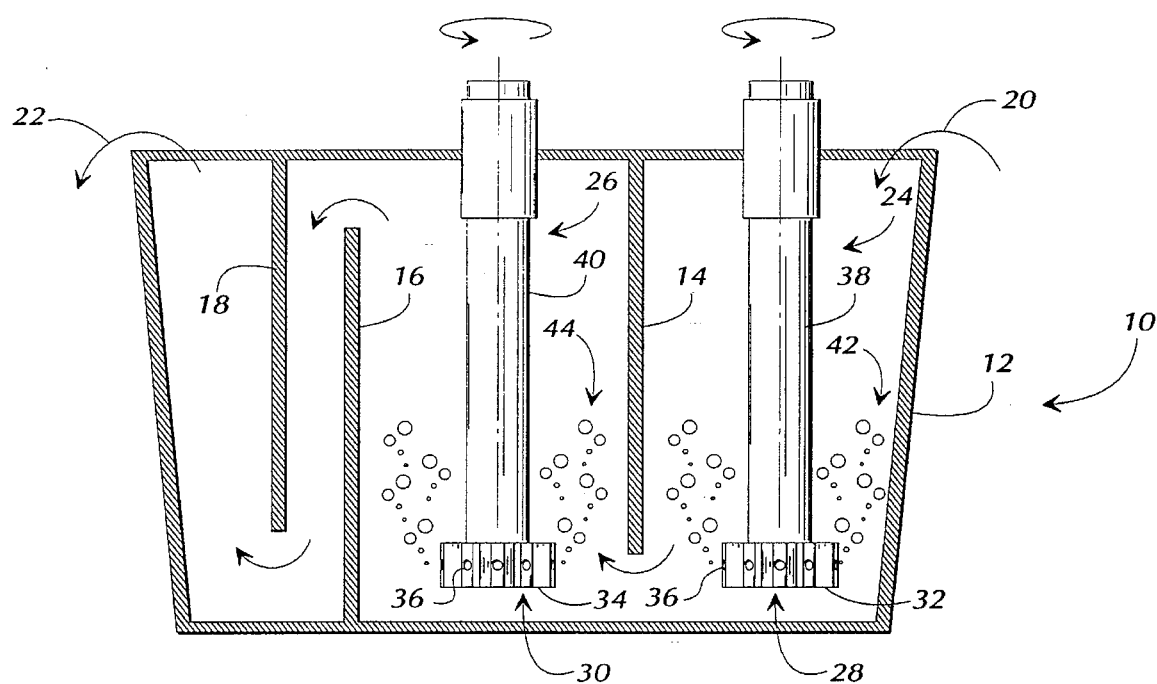
FIG. 1 is a schematic cross-sectional view of a disclosed embodiment of a degassing unit useful in the present invention.

The present invention relates to an improved process for treating molten aluminum or aluminum alloys to remove undesirable impurities, such as alkali and alkaline metals and hydrogen, by in-line rotor degassing. In the prior art process, flows of chlorine gas have been relatively large, such as 0.24 and 4.45 NL/min., to maximize the removal of alkali and alkaline earth metals. The ratio of premixed fluoride gas to chloride gas has also been between 0.01 to 1.0. see U.S. Pat. No. 5,145,514. However, it has been unexpectedly discovered that lower flow rates of chlorine gas will satisfactorily reduce the amount of alkali and alkaline metals in molten aluminum or aluminum alloys, particularly reducing amounts of sodium and calcium. The reduced flow rates of chlorine gas also unexpectedly produce satisfactory inclusion flotation so that mechanical removal from a degassing unit, such as an Alpur in-line rotor degassing unit, can be affected. In addition, increased amounts of sulfur hexafluoride are used to react with molten chloride salts to form chloride/fluoride salts which have elevated melting points so that they will solidify and can be mechanically removed from the molten aluminum or aluminum alloy. Such results are accomplished with lower chloride emissions while maintaining metal cleanliness and quality.

The term aluminum is used herein to cover the element Al itself and also alloys of which Al is the major component. The present invention is of particular importance in relation to magnesium-rich alloys, for example those of the 5000 series of the Aluminum Association Register. It is particularly preferred to use the present invention when making aluminum-magnesium alloys having a magnesium content greater than approximately 3.5%.

The purpose of the treatment of the present invention is to remove unwanted alkali metals (particularly sodium), alkaline earth metals (particularly calcium) and hydrogen from the molten aluminum melt (together with any solid particulate inclusions present). In order to accomplish this, it has been discovered that in accordance with the present invention, the chlorine gas flow rate should be significantly reduced and the sulfur hexafluoride flow rate should be significantly increased over the flow rates of the prior art. Furthermore, it is an essential aspect of the present invention that the molten aluminum is first contacted with chlorine gas and then subsequently contacted with a mixture of sulfur hexafluoride gas and chlorine gas.

Accordingly, the present invention comprises first treating the molten aluminum by rotor injection with an initial chlorine gas flow rate of between approximately 0.005 and 0.025 scfm. The molten aluminum is then treated by rotor injection with a mixture of sulfur hexafluoride and chlorine. In this second treatment step, the sulfur hexafluoride gas flow rate is between approximately 0.012 and 0.032 scfm and the chlorine gas flow rate is between approximately 0.005 and 0.025 scfm. These flow rates are for aluminum flow rates of between approximately 620 and 810 lbs/min. A particularly preferred rate of treatment is a chlorine gas flow rate of approximately 0.025 for the first treatment and a sulfur hexafluoride gas flow rate of approximately 0.032 scfm mixed with and a chlorine gas flow rate of approximately 0.025 for the second treatment for an aluminum flow rate of approximately 630 lbs/min.

The gas flow rates useful in the present invention are directly proportional to the flow rate of the molten aluminum being treated. When the flow rates are standardized based upon aluminum flow rate, the flow rates in accordance with the present invention are a chlorine gas flow rate of between approximately 0.00061 and 0.00403 scf/100 lbs aluminum and a sulfur hexafluoride gas flow rate of between approximately 0.00146 and 0.00516 scf/100 lbs aluminum.

The reactive gasses of the present invention, i.e., the chlorine gas and the sulfur hexafluoride gas, can be mixed with an inert gas carrier or the reactive gasses may be used directly to treat the aluminum. When a carrier gas is used, it is desirable to mix the reactive gas with an inert gas, such as, argon, nitrogen, or any other suitable inert gas. The proportion of active gas to inert carrier gas may be between approximately 1% and 50% by volume; preferably, between approximately 2% and 10% by volume.

With reference to FIG. 1, it will be seen that there is a degassing unit 10 comprising a refractory lined vat 12 for degassing molten aluminum contained therein in a continuous process. The vat 12 includes a plurality of baffles 14, 16 and 18 which provide a tortuous path through which the molten aluminum must traverse from the metal inlet, shown by the arrow 20, to the metal outlet, shown by the arrow 22.

Extending downwardly into the vat is an entrance rotor 24 and an exit rotor 26. The rotors 24, 26 are rotatably drive by motors (not shown) to rapidly rotate the rotors. The ends 28, 30 of the rotors 24, 26, respectively, each have a splined propeller 32, 34 attached thereto. Each of the splines on the propellers 32, 34 includes a hole 36 which is in communication with the hollow shafts 38, 40 of the rotors 24, 26. The hollow shafts 38, 40 of each of the rotors 24, 26 are each connected to a source of pressurized gas (not shown) for treating molten aluminum contained in the vat 12.

The order of treatment of the molten aluminum with the reactive gasses is an essential aspect of the present invention. The entrance rotor 24 is connected to a source (not shown) of premixed chlorine gas and argon gas. The exit rotor 26 is connected to a source of premixed sulfur hexafluoride gas, chlorine gas and argon gas.

The amount of chlorine gas which is used to treat the molten aluminum from the entrance rotor 24 is a chlorine gas flow rate of between approximately 0.005 and 0.025 scfm. The amount of chlorine gas which is used to treat the molten aluminum from the exit rotor 26 is a chlorine gas flow rate of between approximately 0.005 and 0.025 scfm. The amount of sulfur hexafluoride gas which is used to treat the molten aluminum from the exit rotor 26 is a sulfur hexafluoride gas flow rate of between approximately 0.012 and 0.032 scfm. The ratio of the sulfur hexafluoride gas to the chlorine gas used to treat the molten aluminum from the exit rotor 26 is between approximately 1.25 and 2.5. The foregoing rates are for treating molten aluminum at an aluminum flow rate of between approximately 620 and 810 lbs/min. Both the chlorine and the mixture of sulfur hexafluoride and chlorine are preferably mixed with an argon carrier gas having a flow rate of approximately 2.65 scfm.

The present invention is used by providing a continuous flow of molten aluminum to the metal inlet 20 of the vat 12. The vat 12 is filled with molten aluminum. The flow of molten aluminum through the degassing unit 10 travels from the metal inlet 20, under the baffle 14, over the baffle 16 and under the baffle 18 to the metal outlet 22. After leaving the metal outlet 22, the molten aluminum is passed through a ceramic foam filter ("CFF") (not shown) and then cast into an ingot, or other desired shape, at a casting station (not shown).

As the molten aluminum travels trough the degassing unit 10, it is first exposed to the chlorine gas and argon gas mixture escaping from the holes 36 in the splines of the propeller 32 of the entrance rotor 24 shown as bubbles 42 rising through the molten metal. Then, the molten aluminum is exposed to the sulfur hexafluoride gas, chlorine gas and argon gas mixture escaping from the holes 36 in the splines of the propeller 34 of the exit rotor 26 shown as bubbles 44 rising through the molten metal. It is believed that the sequential exposure of the molten aluminum to the different reactive gas combinations from the two rotors is an essential aspect of the present invention.

Without committing to a specific mechanism by which the present invention operates, it is believed that it is essential to first expose the molten aluminum to chlorine gas in order to form molten chloride salts. It is believed that the molten chloride salts play an important role in reducing the amount of sodium and calcium in the molten metal. Then, after the molten metal has been exposed to an initial dose of chlorine gas, the molten metal is exposed to a mixture of sulfur hexafluoride and chlorine gas. This second treatment of the molten aluminum to reactive gasses, in which the sulfur hexafluoride gas is the predominant gas, then converts the molten chloride salts to solid chloride/fluoride salts which either float to the top of the molten aluminum in the degassing unit 10 or are removed by the CFF prior to casting.

The following examples are illustrative of the present invention and are not intended to limit the scope of the invention as set forth in the appended claims.

EXAMPLE 1

Seven drops of Alloy 5182 were cast with increased additions of chlorine gas and sulfur hexafluoride. The chlorine/argon gas was added to both the entrance and exit rotors of an Alpur degassing unit manufactured by Pechiney Aluminum Engineering, such as shown in FIG. 1. In addition, sulfur hexafluoride was also added to the exit rotor. The gas flow rates are shown below in Table 1:

TABLE 1

| Setting | No. of Drops | Ar/ Rotor (scfm) | $Cl_2$/ Rotor (scfm) | SF6 - Exit Rtr. (scfm) |
|---------|--------------|------------------|----------------------|------------------------|
| 1 | 2 | 2.65 | 0.005 | 0.012 |
| 2 | 2 | 2.65 | 0.015 | 0.022 |
| 3 | 3 | 2.65 | 0.025 | 0.032 |

The metal flow rate for each drop was 630 lbs/min. A 40 ppi CFF was placed upstream and downstream of the Alpur.

Dross in the Alpur became drier as chlorine gas and sulfur hexafluoride flows increased. A white salt formed in the Alpur, providing physical evidence that molten chloride salts were forming chloride/fluoride salts with melting points above that of the molten metal.

Porous disk filtration apparatus ("PoDFA") is an analytical process developed by Alcan for measuring inclusions. PoDFA data were collected on each drop to assess metal cleanliness. Analytical samples were taken to determine sodium/calcium reduction across the Alpur. ALSCAN readings were taken to monitor hydrogen removal. Edge crack ratings were obtained from hot rolling, as were "black-line" counts (a visual inspection for surface defects) from the coating line.

The PoDFA results, shown in Table 2 below, demonstrate that sulfur hexafluoride not only reduced the presence of molten salts, it also enhanced inclusion flotation.

TABLE 2

| Setting | Before Alpur PoDFA ($mm^2$/kg) | After Alpur PoDFA ($mm^2$/kg) |
|---------|-------------------------------|-------------------------------|
| 1 | 0.036 | 0.014 |
| 1 | 0.015 | 0.005 |
| 2 | 0.037 | 0.014 |
| 2 | 0.032 | 0.009 |
| 3 | 0.039 | 0.006 |
| 3 | 0.033 | 0.006 |
| 3 | 0.176 | 0.004* |

*Note: This reading was taken after the final CFF, as samples were not taken between the Alpur and the final CFF on this drop. PoDFA counts, however, were not improved across the CFF during these trials. Therefore, it is believed that this reading was probably representative of the metal quality exiting the Alpur.

Sodium and calcium reduction increased with increasing chlorine gas and sulfur hexafluoride flows. For the highest setting, average stoichiometric reduction of sodium and calcium was about 2.8 times higher than with chlorine gas alone. The sulfur hexafluoride did not inhibit alkali and alkaline metal reduction.

Hydrogen levels were acceptable. Downstream of the Alpur, average hydrogen ranged from 0.11 to 0.13 cc/100 g. Increased rates of sulfur hexafluoride did not effect removal of hydrogen during these trials.

All ingots produced during this trial rolled well in the hot mill, with 50% edge-rated at 1 and the rest at 2 on a scale of 1 to 4 with 1 being the best. These results suggest that edge rating improved with increased chlorine gas and sulfur hexafluoride flows. Black line data was acceptable for all samples.

EXAMPLE 2

The same procedure was followed as Example 1, except that chlorine gas flow was 0.025 scfm per rotor and sulfur hexafluoride flow was 0.032 scfm in the exit rotor. Ten drops were tested.

The PoDFA results, shown in Table 3 below, demonstrate that sulfur hexafluoride not only reduced the presence of molten salts, it also enhanced inclusion flotation.

TABLE 3

| Test No. | Before Alpur PoDFA ($mm^2$/kg) | After Alpur PoDFA ($mm^2$/kg) |
|----------|-------------------------------|-------------------------------|
| 1 | 0.116 | 0.018 |
| 2 | 0.161 | 0.014 |
| 3 | 0.042 | 0.013 |
| 4 | 0.040 | 0.010 |
| 5 | 0.034 | 0.008 |
| 6 | 0.165 | 0.029 |
| 7 | 0.065 | 0.008 |
| 8 | 0.029 | 0.009 |
| 9 | 0.111 | 0.016 |
| 10 | 0.089 | 0.013 |

A solid white salt formed in the Alpur, indicating a reaction of sulfur hexafluoride with molten chloride salts. The presence of molten chloride salts in the melt is undesirable because those salts coat the ceramic foam filter and act as a lubricant, thereby reducing filter capture efficiency. The reduced amounts of molten chloride salts produced by the present invention prior to final ceramic foam filtration are highly desirable.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A process for treating molten aluminum or aluminum alloys containing impurities to reduce the amount of impurities contained therein by in-line rotor degassing, said process comprising the sequential steps of:
   (a) contacting said molten aluminum or aluminum alloy with chlorine gas by rotor injection; and
   (b) contacting the molten aluminum or aluminum alloy of step (a) with a mixture of chlorine gas and sulfur hexafluoride gas by rotor injection, wherein the chlorine gas flow rate in step (a) is between approximately 0.005 to 0.025 scfm and the gas flow rate in step (b) is a combination of a sulfur hexafluoride gas flow rate of between approximately 0.012 and 0.032 scfm and a chlorine gas flow rate of between approximately 0.005 to 0.025 scfm and wherein the ratio of sulfur hexafluoride flow to chlorine gas flow in step (b) is between approximately 1.25 and 2.5 by volume for a molten aluminum or aluminum alloy flow rate of between approximately 620 and 810 lbs/min.

2. The process of claim 1, wherein said aluminum alloy is an aluminum-magnesium alloy.

3. The process of claim 2, wherein said aluminum-magnesium alloy contains more than 3.5% magnesium.

4. The process of claim 1, wherein said impurities include sodium and calcium.

5. The process of claim 1, wherein said chlorine gas flow rate in step (a) is approximately 0.0.025 scfm.

6. The process of claim 1, wherein sulfur hexafluoride gas flow rate is approximately 0.032 scfm.

7. The process of claim 1, wherein aluminum flow rate is approximately 630 lbs/min.

8. A process for treating molten aluminum or aluminum alloys containing impurities to reduce the amount of impurities contained therein by in-line rotor degassing, said process comprising the sequential steps of:
   (a) contacting said molten aluminum or aluminum alloy with chlorine gas by rotor injection; and
   (b) contacting the molten aluminum or aluminum alloy of step (a) with a mixture of chlorine gas and sulfur hexafluoride gas by rotor injection, wherein the chlorine gas flow rate in step (a) is between approximately 0.00061 and 0.00403 scf/100 lbs aluminum and the gas flow rate in step (b) is a combination of a sulfur hexafluoride gas flow rate of between approximately 0.00146 and 0.00516 scf/100 lbs aluminum and a chlorine gas flow rate of between approximately 0.00061 and 0.00308 scf/100 lbs aluminum and wherein the ratio of sulfur hexafluoride flow to chlorine gas flow in step (b) is between approximately 1.25 and 2.5 by volume.

9. The process of claim 8, wherein said aluminum alloy is an aluminum-magnesium alloy.

10. The process of claim 9, wherein said aluminum-magnesium alloy contains more than 3.5% magnesium.

11. The process of claim 8, wherein said impurities include sodium and calcium.

12. The process of claim 8, wherein said chlorine gas flow rate in step (a) is approximately 0.00403 scf/100 lbs aluminum.

13. The process of claim 8, wherein sulfur hexafluoride gas flow rate in step (b) is approximately 0.00516 scf/100 lbs aluminum.

14. The process of claim 8, wherein said chlorine gas flow rate in step (b) is approximately 0.00403 scf/100 lbs aluminum.

* * * * *